US012380431B2

(12) United States Patent
Venugopalan et al.

(10) Patent No.: US 12,380,431 B2
(45) Date of Patent: Aug. 5, 2025

(54) SYSTEMS, METHODS AND COMPUTER PROGRAM PRODUCTS FOR ASYNCHRONOUS AUTHENTICATION OF DIGITAL WALLET BASED PAYMENT TRANSACTIONS

(71) Applicant: Mastercard International Incorporated, New York, NY (US)

(72) Inventors: Vijin Venugopalan, Singapore (SG); Aishwarya Namjoshi, Mumbai (IN); Saket Bhardwaj, Mumbai (IN)

(73) Assignee: Mastercard International Incorporated, Purchase, NY (US)

( * ) Notice: Subject to any disclaimer, the term of this patent is extended or adjusted under 35 U.S.C. 154(b) by 115 days.

(21) Appl. No.: 17/750,718

(22) Filed: May 23, 2022

(65) Prior Publication Data

US 2022/0374873 A1    Nov. 24, 2022

(30) Foreign Application Priority Data

May 24, 2021  (IN) .............................. 202111023158

(51) Int. Cl.
  *G06Q 20/36*   (2012.01)
  *G06Q 20/40*   (2012.01)
  *H04L 9/40*    (2022.01)
(52) U.S. Cl.
  CPC ....... *G06Q 20/3674* (2013.01); *G06Q 20/401* (2013.01); *G06Q 20/409* (2013.01); *H04L 63/0838* (2013.01)
(58) Field of Classification Search
  CPC . G06Q 20/3677; G06Q 20/401; G06Q 20/409

(Continued)

(56) References Cited

U.S. PATENT DOCUMENTS 6,000,832 A    12/1999  Franklin
6,327,578 B1   12/2001  Linehan
(Continued)

FOREIGN PATENT DOCUMENTS

CN    101192295 A    6/2008
EP      0919945 A2   6/1999
(Continued)

OTHER PUBLICATIONS

PCT International Search Report, Application No. PCT/GB2017/051818, dated Sep. 1, 2017, 2 pp.
(Continued)

*Primary Examiner* — Lindsay M Maguire
(74) *Attorney, Agent, or Firm* — Pramudji Law Group PLLC; Ari Pramudji

(57) ABSTRACT

The invention provides systems, methods and computer program products for asynchronous authentication of digital wallet based payment transactions. The invention enables secure authentication of contactless payment card based payment transactions that have been implemented through contactless communication between a payor device and a payment terminal device using near-field-communication. In various embodiments, the invention provides methods, systems, servers, and computer program products for authentication of a contactless communication protocol based digital wallet payment transaction, as substantially described herein.

20 Claims, 10 Drawing Sheets

(58) Field of Classification Search
USPC .......................................................... 705/44
See application file for complete search history.

(56) References Cited

U.S. PATENT DOCUMENTS

| | | | |
|---|---|---|---|
| 6,434,238 | B1 | 8/2002 | Chaum et al. |
| 7,027,773 | B1 | 4/2006 | McMillin |
| 7,357,309 | B2 | 4/2008 | Ghosh |
| 7,657,748 | B2 | 2/2010 | Gentry |
| 8,720,771 | B2 | 5/2014 | MacKinnon |
| 9,195,984 | B1* | 11/2015 | Spector ............... G06Q 20/367 |
| 9,262,651 | B2 | 2/2016 | Paulsen |
| 9,595,030 | B2 | 3/2017 | Ekselius |
| 9,674,892 | B1 | 6/2017 | Li |
| 9,741,036 | B1 | 8/2017 | Grassadonia |
| 9,774,401 | B1 | 9/2017 | Borrill |
| 10,496,856 | B2 | 12/2019 | Palermo |
| RE47,894 | E | 3/2020 | Wang |
| 10,706,400 | B1 | 7/2020 | Puffer et al. |
| 10,902,423 | B2 | 1/2021 | Radu et al. |
| 10,963,871 | B2 | 3/2021 | Safak et al. |
| 11,074,564 | B2 | 7/2021 | Gurunathan et al. |
| 11,080,697 | B2 | 8/2021 | Lakka et al. |
| 11,080,713 | B2 | 8/2021 | Kohli |
| 11,093,938 | B2 | 8/2021 | Parekh |
| 11,107,078 | B2 | 8/2021 | Mariappan et al. |
| 11,157,896 | B2 | 10/2021 | Nwokolo et al. |
| 11,301,865 | B2 | 4/2022 | Tang |
| 11,544,781 | B2 | 1/2023 | Dogin |
| 2004/0019571 | A1 | 1/2004 | Hurwitz |
| 2006/0049258 | A1 | 3/2006 | Pikivi |
| 2006/0219776 | A1 | 10/2006 | Finn |
| 2006/0283960 | A1 | 12/2006 | Top |
| 2007/0022058 | A1 | 1/2007 | Labrou et al. |
| 2007/0125840 | A1 | 6/2007 | Law et al. |
| 2008/0071681 | A1 | 3/2008 | Khalid |
| 2009/0048971 | A1 | 2/2009 | Hathaway et al. |
| 2009/0104888 | A1 | 4/2009 | Cox |
| 2011/0022521 | A1 | 1/2011 | Collinge et al. |
| 2011/0178884 | A1 | 7/2011 | Teicher et al. |
| 2011/0184867 | A1 | 7/2011 | Varadarajan |
| 2011/0215159 | A1 | 9/2011 | Jain |
| 2011/0238573 | A1* | 9/2011 | Varadarajan ....... G06Q 20/3263 |
| | | | 705/43 |
| 2012/0036360 | A1 | 2/2012 | Bassu et al. |
| 2012/0084836 | A1 | 4/2012 | Mahaffey et al. |
| 2012/0116902 | A1 | 5/2012 | Cardina et al. |
| 2013/0212007 | A1 | 8/2013 | Mattsson |
| 2013/0212025 | A1 | 8/2013 | Tanner |
| 2013/0262296 | A1 | 10/2013 | Thomas et al. |
| 2013/0297508 | A1 | 11/2013 | Belamant |
| 2014/0040139 | A1 | 2/2014 | Brudnicki |
| 2014/0061302 | A1 | 3/2014 | Hammad |
| 2014/0138435 | A1 | 5/2014 | Khalid |
| 2014/0189359 | A1 | 7/2014 | Marien |
| 2014/0191031 | A1 | 7/2014 | Paulsen |
| 2014/0258135 | A1 | 9/2014 | Park |
| 2014/0279556 | A1 | 9/2014 | Priebatsch et al. |
| 2014/0358777 | A1 | 12/2014 | Gueh |
| 2015/0032627 | A1 | 1/2015 | Dill et al. |
| 2015/0032636 | A1 | 1/2015 | Wedekind |
| 2015/0046339 | A1 | 2/2015 | Wong |
| 2015/0112870 | A1 | 4/2015 | Nagasundaram et al. |
| 2015/0137949 | A1 | 5/2015 | Rofougaran et al. |
| 2015/0142673 | A1 | 5/2015 | Nelsen et al. |
| 2015/0262180 | A1 | 9/2015 | Hambleton |
| 2015/0269566 | A1 | 9/2015 | Gaddam et al. |
| 2015/0294305 | A1 | 10/2015 | Wang |
| 2015/0302390 | A1 | 10/2015 | Huxham et al. |
| 2015/0310425 | A1 | 10/2015 | Cacioppo |
| 2016/0065370 | A1* | 3/2016 | Le Saint ............... H04L 9/0891 |
| | | | 713/155 |
| 2016/0071095 | A1 | 3/2016 | Foerster et al. |
| 2016/0117715 | A1 | 4/2016 | Gross et al. |
| 2016/0217467 | A1 | 7/2016 | Smets et al. |
| 2016/0224971 | A1 | 8/2016 | Aabye |
| 2016/0307186 | A1 | 10/2016 | Noe |
| 2017/0091758 | A1 | 3/2017 | Kim et al. |
| 2017/0178090 | A1 | 6/2017 | Sarin |
| 2017/0330181 | A1 | 11/2017 | Ortiz |
| 2017/0330184 | A1* | 11/2017 | Sabt .................... G06Q 20/327 |
| 2017/0344974 | A1 | 11/2017 | Britt |
| 2018/0005231 | A1 | 1/2018 | Grassadonia et al. |
| 2018/0047016 | A1 | 2/2018 | Sarin |
| 2018/0232734 | A1 | 8/2018 | Smets et al. |
| 2018/0349907 | A1 | 12/2018 | Dixon |
| 2019/0026716 | A1 | 1/2019 | Anbukkarasu |
| 2019/0034929 | A1 | 1/2019 | Tang et al. |
| 2019/0066097 | A1 | 2/2019 | Mackie |
| 2019/0075094 | A1 | 3/2019 | Clarke |
| 2019/0108462 | A1 | 4/2019 | Deloo |
| 2019/0147449 | A1 | 5/2019 | Cole |
| 2019/0188696 | A1 | 6/2019 | Carpenter et al. |
| 2019/0196935 | A1 | 6/2019 | Edwards |
| 2019/0205575 | A1 | 7/2019 | Gardiner et al. |
| 2019/0213585 | A1* | 7/2019 | Patni .................. H04L 63/0838 |
| 2019/0228408 | A1 | 7/2019 | Sing |
| 2019/0253434 | A1 | 8/2019 | Biyani et al. |
| 2019/0318345 | A1 | 10/2019 | Kallugudde |
| 2019/0362339 | A1 | 11/2019 | Gurunathan et al. |
| 2019/0392411 | A1 | 12/2019 | Jain et al. |
| 2020/0019961 | A1 | 1/2020 | Silvestre |
| 2020/0027086 | A1 | 1/2020 | Rao et al. |
| 2020/0160325 | A1 | 5/2020 | Kim et al. |
| 2020/0219090 | A1 | 7/2020 | Zarakas et al. |
| 2020/0265420 | A1 | 8/2020 | Hamdan et al. |
| 2020/0302441 | A1 | 9/2020 | Collinge et al. |
| 2020/0410483 | A1 | 12/2020 | Dill et al. |
| 2021/0012322 | A1* | 1/2021 | Manchanda ......... G06Q 20/352 |
| 2021/0065156 | A1 | 3/2021 | Kadiwala et al. |
| 2021/0217005 | A1 | 7/2021 | Mehrhoff et al. |
| 2021/0287211 | A1 | 9/2021 | Aabye et al. |
| 2022/0051231 | A1 | 2/2022 | Laracey |
| 2022/0122081 | A1 | 4/2022 | Wagner et al. |

FOREIGN PATENT DOCUMENTS

| | | |
|---|---|---|
| EP | 2189934 A2 | 5/2010 |
| EP | 2390817 A | 11/2011 |
| EP | 3618403 A1 | 3/2020 |
| JP | 2008129890 A | 6/2008 |
| JP | 2008-204248 A | 9/2008 |
| KR | 101236544 B1 | 3/2013 |
| KR | 10-2014-0008668 A | 1/2014 |
| KR | 101502460 B1 | 3/2015 |
| KR | 101679783 B1 | 11/2016 |
| KR | 2016-0140216 A | 12/2016 |
| KR | 20170058903 A | 5/2017 |
| WO | 1997046964 A1 | 12/1997 |
| WO | 2001-099070 A2 | 12/2001 |
| WO | 2003-038719 A1 | 5/2003 |
| WO | 2008-059465 A2 | 5/2008 |
| WO | 2010-070539 A1 | 6/2010 |
| WO | 2010-099352 A1 | 9/2010 |
| WO | 2010-133096 A1 | 11/2010 |
| WO | 2013-050296 A1 | 4/2013 |
| WO | 2013155627 A1 | 10/2013 |
| WO | 2016-123309 A1 | 8/2016 |
| WO | 2016-161000 A1 | 10/2016 |
| WO | 2017007935 A1 | 1/2017 |
| WO | 2018-031856 A1 | 2/2018 |
| WO | 2019-136044 A1 | 7/2019 |
| WO | 2019-161003 A1 | 8/2019 |
| WO | 2020-243286 A | 12/2020 |

OTHER PUBLICATIONS

EP Communication pursuant to Article 94 (3) EPC; 19184252.5, Aug. 25, 2022, pp. 1-7.
EP 19187159.9 European Summons to attend oral proceedings pursuant to Rule 115 (1) dated Jul. 29, 2022, pp. 1-10.
PCT International Search Report and Written Opinion; PCT/US2020-039521; Oct. 14, 2020.

(56) References Cited

OTHER PUBLICATIONS

EPO Office Action; EP 19187159.9; Jun. 8, 2021.

EPO Search Report; EP 19187159.9; Apr. 17, 2020.

Yingjiu, et al.; A Security-Enhanced One-Time Payment Scheme for Credit Card; 14th International Workshop on Research Issues on Data Engineering; Web Services for E-Commerce and E-Government Applications (RIDE'04); IEEE; 2004.

EMV MasterCard Contactless Transaction Flow, EMV Level 2 Kernels, https://www.level2kernel.com/emv-mastercard-contactless-transaction.html, 2021, pp. 1-3.

EMV Overview—Elavon Developer Portal, https://developer.elavon.com/na/docs/viaconex/1.0.0/emv-integration-guide/3_emv_overview, 2022, pp. 1-33.

EMV, https://en.wikipedia.org/wiki/EMV, Wikipedia, Jan. 18, 2022 (last edited), pp. 1-26.

Tokenization (data security), https://en.wikipedia.org/wiki/Tokenization_(data_security), Wikipedia, Jan. 8, 2022 (last edited), pp. 1-8.

EMV Integrated Circuit Card Specifications for Payment Systems, Book 4 Cardholder, Attendant, and Acquirer Interface Requirements, Nov. 2011, pp. 1-154, EMC Version 4.3 Book 4.

A Guide to EMV Chip Technology, Nov. 2014, pp. 1-36, Version 2.0, EMVCo, LLC.

Field 55: ICC Data, Elavon Developer Portal, https://developer-eu.elavon.com/docs/eisop/field-descriptions/field-55-icc-data, 2021, pp. 1-11.

Terminal verification results, https://en.wikipedia.org/wiki/Terminal_verification_results, Wikipedia, Dec. 12, 2021 (last edited), pp. 1-3.

Smart card application protocol data unit, https://en.wikipedia.org/wiki/Smart_card_application_protocol_data_unit, Wikipedia, Aug. 24, 2021 (last edited), pp. 1-3.

O. Ogundele, et al.; "The Implementation of a Full EMV Smartcard for a Point-of-Sale Transaction," World Congress on Internet Security (WorldCIS-2012), Guelph, ON, Canada, 2012, pp. 28-35.

EMVco Payment Account Reference (PAR): A Primer, Version 1.1, Secure Technology Alliance, Apr. 30, 2018, pp. 1-20.

PCT/SG2022/050327 Search Report and Written Opinion dated Dec. 23, 2022, pp. 1-20.

PCT/US2022/049771 International Search Report and Written Opinion dated Mar. 20, 2023, pp. 1-19.

PCT/US2020/0402061 International Search Report and Written Opinion dated Oct. 21, 2020.

PCT/US2021/018344 International Search Report and Written Opinion dated May 27, 2021, pp. 1-11.

EP 20159634.3 Extended European Search Report dated Jul. 30, 2020, pp. 1-8.

PCT/US2021/042321 International Search Report and Written Opinion dated Nov. 11, 2021, pp. 1-11.

GB 2012833.6 Search Report dated Jan. 27, 2021, pp. 1-2.

PCT International Search Report and Written Opinion; PCT/US2021/047077; Dec. 14, 2021.

SG10202204968V Written Opinion dated Jan. 23, 2025, pp. 1-26.

\* cited by examiner

| Merchant Data Transmitted from Payment Terminal Device to Payor Device | |
|---|---|
| Merchant Category Code | MCC |
| Merchant ID | MID |
| Currency | INR |
| Amount | 2,500 |
| Merchant Name | 'ABC' |

| Data Transmitted from Payor Device To Payment Network Validation Server |
|---|
| Merchant Category Code |
| Merchant ID |
| Currency |
| Amount |
| Merchant Name |
| Token Number |
| Device ID |
| Device IP address |
| Payment Application Instance ID |
| Wallet ID |

| Data Transmitted from Payment Network Validation Server To Issuer Server |
|---|
| Currency |
| Amount |
| Merchant Name |
| Token Number |
| OTP |

| Data Transmitted from Payor Device to Payment Network Validation Server |
|---|
| Merchant Category Code |
| Merchant ID |
| Currency |
| Amount |
| Merchant Name |
| Token Number |
| Payor Device ID |
| Payor Device IP Address |
| Payment Application Instance ID |
| Wallet ID |
| OTP |

| Data Transmitted from Acquirer Server to Payment Network Validation Server |
|---|
| Merchant Category Code |
| Cryptogram |
| Merchant ID |
| Currency |
| Amount |
| Merchant Name |
| Token Number |
| Token Expiry |

SYSTEMS, METHODS AND COMPUTER PROGRAM PRODUCTS FOR ASYNCHRONOUS AUTHENTICATION OF DIGITAL WALLET BASED PAYMENT TRANSACTIONS

FIELD OF THE INVENTION

The present invention relates to the domain of wallet based payment card transactions, and more particularly to systems, methods and computer program products for asynchronous authentication of digital wallet based payment transactions.

BACKGROUND OF THE INVENTION

Mobile communication devices ("mobile devices") are capable of being configured for several functions. Typical mobile devices include functionality for data and voice communications, imaging and video capture, voice storage, audio reproduction and playback, image or video display, and the like. Touch based control functionality is also now a standard feature of mobile devices—which has been found to considerably simplify the user interface aspect of such devices. In addition, mobile devices are now commonly available with near field communication ("NFC") capabilities.

Near field communication refers to a contactless-type short-range wireless communication that operates at a frequency bandwidth of 13.56 MHz. Near field communication comprises technology that requires a short distance of approximately 10 cm to transmit data between terminals equipped with an NFC transceiver. Near field communication is excellent in proximity, bi-directionality, and security, compared to other communication technologies, and has an advantage of establishing two way communication between terminals in $\frac{1}{10}$ second or less without requiring complex pairing. As a result, near field communication technology is also now routinely incorporated within payment cards such as credit cards or debit cards—for enabling contactless payment transactions.

A common type of electronic payment transaction involves initiating payment by presenting a payment card at a POS terminal, and inputting the transaction amount and payor authentication information (for example a personal identification number (PIN), password, passcode, or one-time password (OTP)) at the point-of-sale (POS) terminal. The transaction amount and payor authentication information is electronically forwarded (through an acquirer associated with the POS terminal and a centralized payment network associated with the payment card) to an issuer associated with the payor's payment account—whereafter the issuer decides whether to authorize the transaction, based on (i) a determination that the transaction amount is less than an available balance associated with the payor's payment account, and (ii) successful authentication of the payor's identity using the received authentication information.

It has been found that the process steps involving swiping the magnetic stripe of a payment card in a POS terminal, and input of authentication information and/or transaction amount information at the POS terminal is generally considered inconvenient and interferes with the overall payment experience. Further, the wait time associated with card swipe events has also been found to be relatively greater than in the case of contactless payments. Contactless payment transactions have therefore been gaining increasing popularity—as a result of the lower wait time, and also in view of the fact that for transactions under a predefined value, the requirement for input of payor authentication information can be avoided in certain jurisdictions for such transactions.

Additionally, given the increasing popularity of electronic commerce and electronic payment transactions, there has been a steep increase in payment card transactions being effected through digital wallets implemented within mobile devices. FIG. 1 illustrates a conventional system environment of a type that enables digital wallet based contactless payments at a merchant terminal/point-of-sale (POS) terminal.

As shown in FIG. 1, a conventional system environment 100 comprises a NFC enabled payor device 102 (for example, a smartphone or other mobile communication device) operated by a payor. One or more digital wallets are implemented by software application(s) installed within the payor device 102. The payor accesses the relevant software application associated with a specific digital wallet, for the purposes of carrying out a payment transaction. The digital wallet stores payment card information or payment account information, and personal information of the payor.

Payor device 102 is brought in proximity to a payment terminal device 104 that has contactless communication capability (for example, a POS terminal having near field communication capabilities)—and a payment transaction is initiated based on wireless communication between payor device 102 and payment terminal device 104. A payment instruction comprising one or more of a payment card identifier, payee account identifier, payment amount and a cryptogram generated by the digital wallet, is transmitted by payment terminal device 104 to an acquirer network 106 (a data network maintained by an acquirer institution with which the payee account is maintained). Acquirer network 106 in turn transmits the payment instruction to an issuer network 110 (a data network maintained by an issuer institution which has issued the payment card or payment account that is being used for the purposes of the payment transaction) through payment network 108 (a data network maintained by an intermediary between the payee's acquirer and the payor's issuer—for example, Mastercard® or Visa®).

The prior art processes typically involve at least one identity authentication step—wherein the payor is required to input a personal identification number (PIN) associated with the payment card (or with a payment account) through a keypad coupled with payment terminal device 104. The input PIN is transmitted onward to issuer network 110—where it is compared against PIN information stored in the records of issuer network 110. Subject to a match, the identity of the payor is authenticated—and the payment transaction is implemented by initiating transfer of the payment amount from the payor account to the payee account. Confirmation of successful transaction completion may thereafter be transmitted back to payment terminal device 104 and/or payor device 102.

There are growing concerns regarding both PIN security as well as a preference for avoiding contact between a payor and a payment terminal device—and as a result, there is need for secure solutions that enable transaction authentication without requiring a payor to input a PIN into the payment terminal device.

BRIEF DESCRIPTION OF THE ACCOMPANYING DRAWINGS

FIG. 4A illustrates a table representing data elements transmitted from a payment terminal device to a payor device for implementing a method for contactless digital wallet based payment transactions in accordance with the present invention.

FIG. 4B illustrates a table representing a first set of data elements transmitted from a payor device to a payment network validation server for implementing a method for contactless digital wallet based payment transactions in accordance with the present invention.

FIG. 4C illustrates a table representing data elements transmitted from a payment network validation server to an issuer server for implementing a method for contactless digital wallet based payment transactions in accordance with the present invention.

FIG. 4D illustrates a table representing a second set of data elements transmitted from a payor device to a payment network validation server for implementing a method for contactless digital wallet based payment transactions in accordance with the present invention.

FIG. 4E illustrates a table representing data elements transmitted from an acquirer server to a payment network validation server for implementing a method for contactless digital wallet based payment transactions in accordance with the present invention.

SUMMARY

The invention provides systems, methods and computer program products for asynchronous authentication of digital wallet based payment transactions. The invention enables secure authentication of contactless payment card based payment transactions that have been implemented through contactless communication between a payor device and a payment terminal device using near-field-communication.

In various embodiments, the invention provides methods, systems, payor devices, servers, and computer program products for authentication of a contactless communication protocol based digital wallet payment transaction, as substantially described herein.

DETAILED DESCRIPTION

The invention provides systems, methods and computer program products for asynchronous authentication of digital wallet based payment transactions. The invention ensures secure authentication of contactless payment card based payment transactions that have been implemented through contactless communication between a payor device and a payment terminal device using near-field-communication. In addition, the invention enables secure transaction authentication without requiring a payor to enter a PIN or other authentication code at a payment terminal device.

Figure 1:
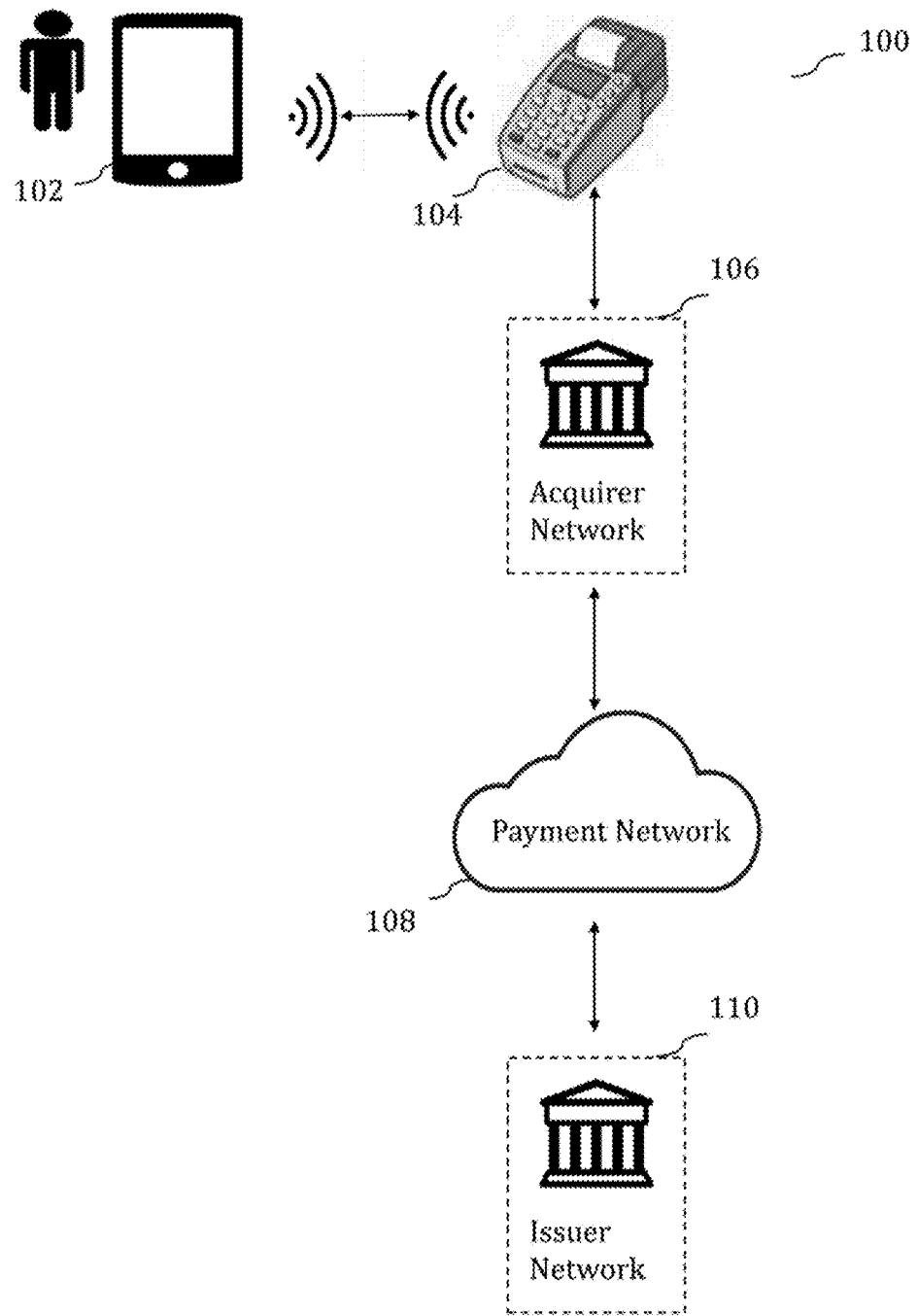
FIG. 1 illustrates a prior art system environment for implementing contactless digital wallet based payment transactions at a payment terminal device.
Figure 2:
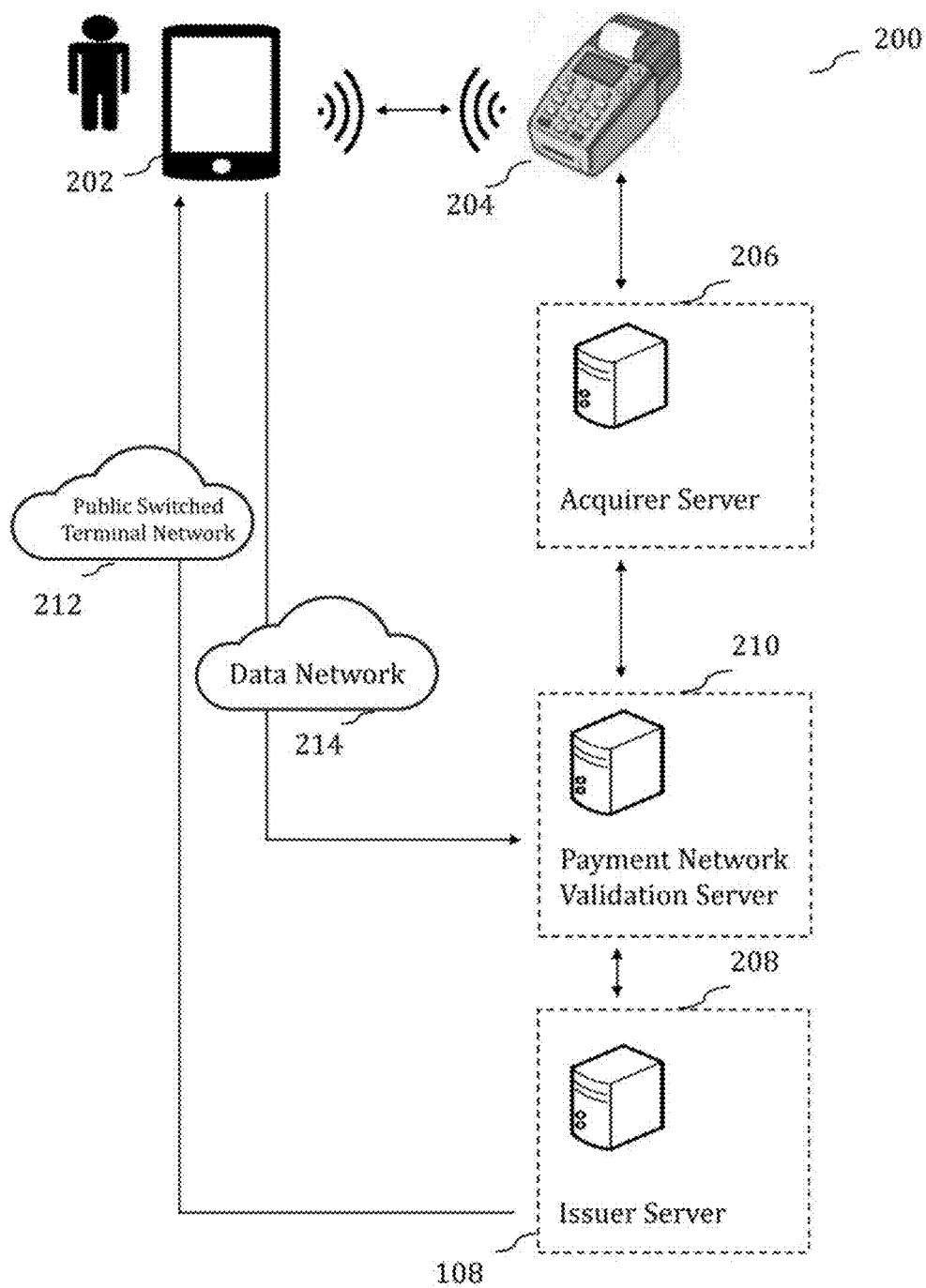
FIG. 2 illustrates a system environment for implementing contactless digital wallet based payment transactions at a payment terminal device in accordance with the present invention.

FIG. 2 illustrates a system environment 200 for implementing contactless digital wallet based payment transactions at a payment terminal device in accordance with the present invention.

As shown in FIG. 2, system environment 200 comprises a NFC (or other contactless communication protocol) enabled payor device 202 (for example, a smartphone or other mobile communication device) operated by a payor. One or more digital wallets are implemented by software application(s) installed within payor device 202. The payor accesses the relevant software application associated with a specific digital wallet, for the purposes of carrying out a payment transaction. The digital wallet stores payment card information or payment account information, and personal information of the payor.

System environment 200 additionally includes a payment terminal device 204 that has contactless communication capability (for example, a POS terminal having near field communication capabilities), and which can commence a NFC (or other contactless communication protocol) based communication session with the payor device 202 when the two devices are brought within a predefined proximity of each other.

Payment terminal device 204 is configured for network communication with an acquirer server 206—wherein acquirer server 206 is associated with or controlled by an acquirer institution at which a payee account is maintained.

Acquirer server 206 is configured for network communication with a payment network validation server 210—wherein payment network validation server 210 is located within or controlled by a payment network. Payment network validation server 210 is in turn configured for network based communication with an issuer server 208 wherein the issuer server 208 is associated with or controlled by an issuer institution at which a payor account or a payor's payment card account is maintained. Payment network validation server 210 may additionally be configured for communication with payor device 202 over a data network 214.

Issuer server 208 may be configured for communication with payor device 202 over a public switched telephone network (PSTN) 212 or over any other voice or data network.

As discussed in more detail below, the system environment 200 of FIG. 2 may be used for implementing the present invention.

Figure 3A:
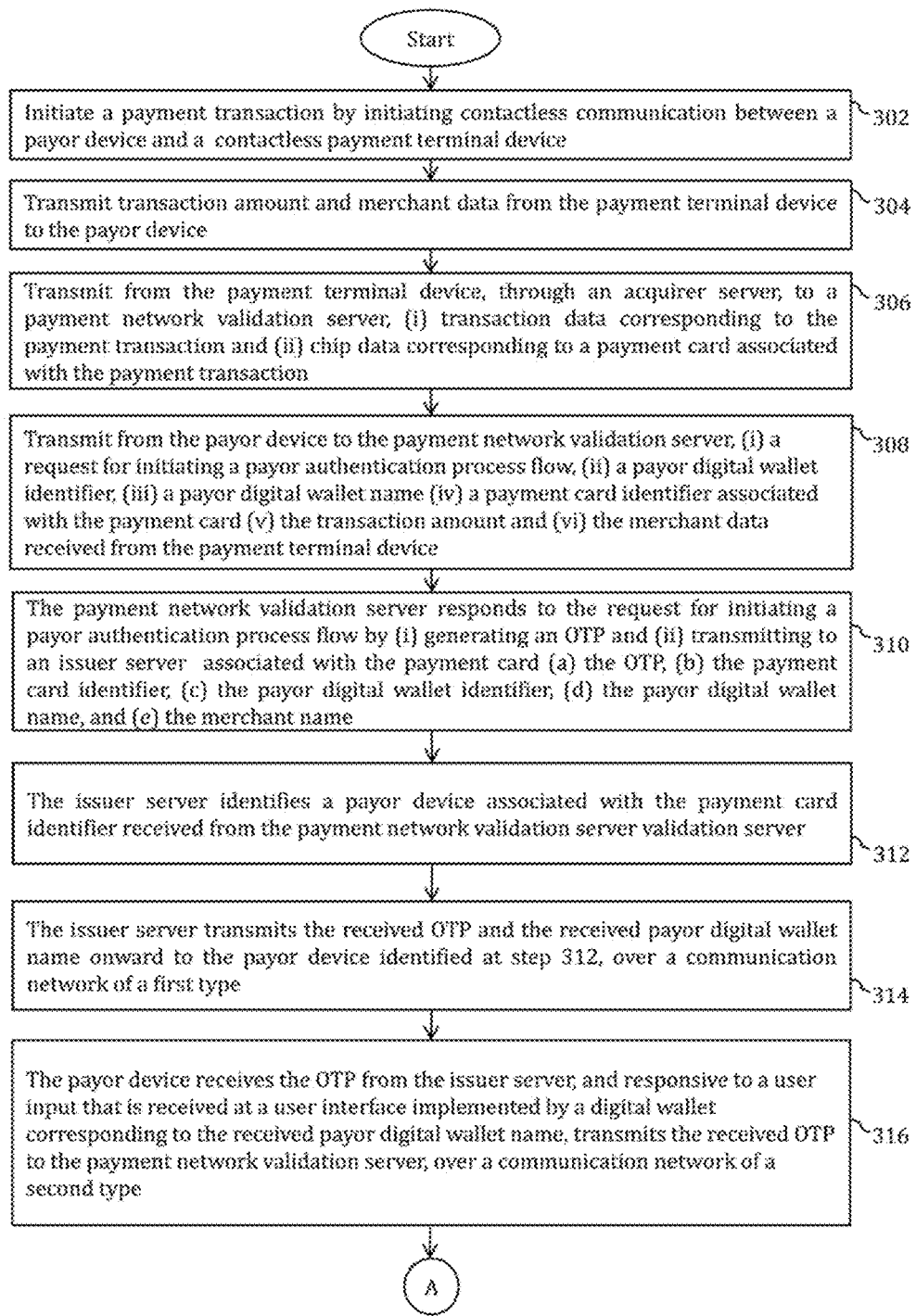
FIGS. 3A and 3B are flowcharts illustrating a method for implementing contactless digital wallet based payment transactions at a payment terminal device in accordance with the present invention.
Figure 3B:
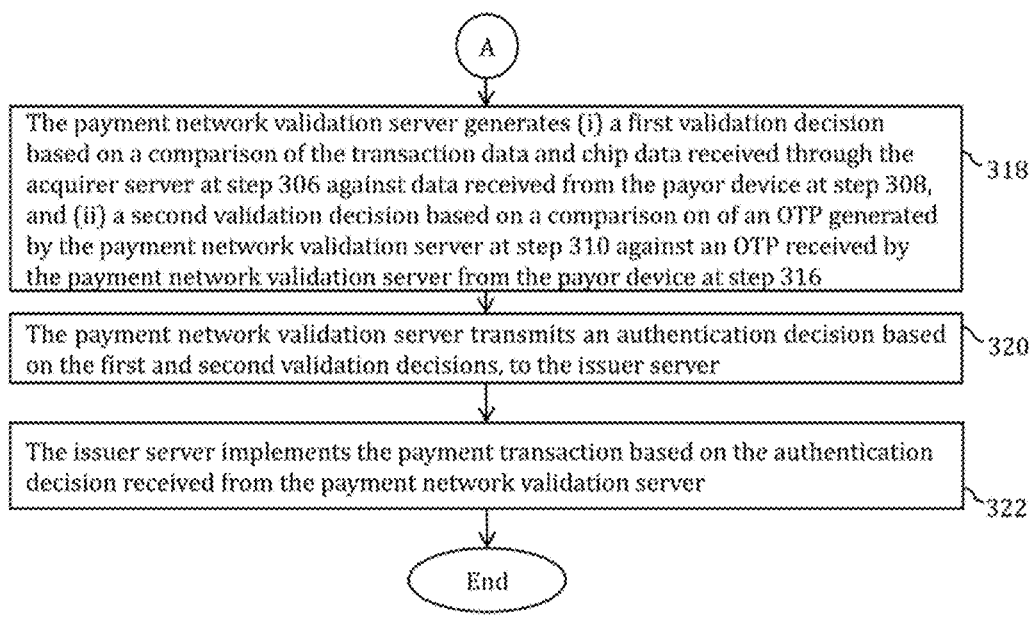

FIGS. 3A and 3B are flowcharts illustrating a method for implementing contactless digital wallet based payment transactions through a payment terminal device in accordance with the present invention.

Step 302 of the method comprises initiating a payment transaction by initiating contactless communication between a payor device 202 and a payment terminal device 204—wherein each of the two devices have contactless communication capabilities or NFC protocol based communication capabilities. The payment transaction may be initiated by placing payor device 202 in proximity of payment terminal device 204 and optionally providing a user input through either of the two devices for initiating a contactless communication session therebetween. In a specific embodiment, the user input for initiating the contactless communication session may be provided to a digital wallet application software that is implemented within payor device 202. In an embodiment, the contactless communication session may comprise a NFC protocol based communication session.

Step 304 comprises transmitting at least a transaction amount and merchant data from payment terminal device 204 to payor device 202. The transaction amount and merchant data are transmitted over the contactless communication session that has been initiated between the two entities. In an embodiment, the merchant data transmitted from payment terminal device 204 to payor device 202 may comprise any one or more of the data elements identified in table 400A of FIG. 4A—i.e. any one or more of (i) a merchant identifier (merchant ID) associated with an intended payee, (ii) a merchant category code (MCC) associated with an intended payee, (iii) a currency associated with the payment transaction (e.g. Indian Rupees, US dollar etc.), and (iv) a merchant name/payee name.

Step 306 comprises transmitting from payment terminal device 204, through acquirer server 206, and onward to payment network validation server 210, (i) transaction data corresponding to the payment transaction and (ii) chip data corresponding to a payment card associated with the payment transaction (i.e. chip data corresponding to an integrated circuit (IC) chip that is implemented within a payment card that is being used by the digital wallet within payor device 202 for the purposes of executing the payment transaction. It will be understood that the data at step 306 is first transmitted by payment terminal device 204 to acquirer server 206, and is thereafter forwarded by acquirer server 206 to payment network validation server 210. The transaction data transmitted at step 306 may include any one or more of (i) a merchant identifier (merchant ID) associated with an intended payee, (ii) a merchant category code (MCC) associated with an intended payee, (iii) a currency associated with the payment transaction (e.g. Indian Rupees, US dollar etc.), and (iv) a merchant name/payee name. In an embodiment, the chip data transmitted at step 306 may include an Europay-Mastercard-Visa (EMV) chip identifier associated with the relevant payment card.

In an embodiment, the data transmitted to payment network validation server 210 at step 306 may comprise any one or more of the data elements identified in table 400E of FIG. 4E—i.e. any one or more of (i) the merchant category code (MCC) associated with the intended payee, (ii) a cryptogram associated with the payment card/payment account, (iii) the merchant identifier (merchant ID) associated with the intended payee, (iv) currency associated with the payment transaction (e.g. Indian Rupees, US dollar etc.), (v) the transaction amount, (vi) the merchant name/payee name, (vii) the token number, and (vii) token expiry information.

Step 308 comprises transmitting from payor device 202 to payment network validation server 210, a request for initiating a payor authentication process flow, along with a first set of data associated with the payment transaction. The first set of data may include one or more of (i) a payor digital wallet identifier, (ii) a payor digital wallet name, (iii) a payment card identifier associated with the payment card, (iv) the transaction amount and (v) the merchant data received from the payment terminal device.

In a more specific embodiment, the first set of data may include any one or more of the data elements identified in table 400B of FIG. 4B—i.e. any one or more of (i) a merchant category code (MCC) associated with an intended payee, (ii) a merchant identifier (merchant ID) associated with the intended payee, (iii) a currency associated with the payment transaction (e.g. Indian Rupees, US dollar etc.), (iv) a merchant name/payee name, (v) a token number, (vi) a device identifier (device ID) associated with payor device 202, (vii) a device internet protocol (IP) address associated with payor device 202, (viii) payment application instance identifier associated with the digital wallet instance being executed within payor device 202, and (ix) a wallet identifier (wallet ID) associated with the digital wallet instance.

At step 310, payment network validation server 210 responds to the request for initiating a payor authentication process flow by (i) generating a one-time-password (OTP) and (ii) transmitting to an issuer server 208 associated with the relevant payment card or payment account that is being used for the payment transaction, data comprising—(a) the generated OTP, (b) the payment card identifier/payment account identifier, (c) the payor digital wallet identifier, (d) the payor digital wallet name, and (e) the merchant name.

In a specific embodiment, the data transmitted from payment network validation server 210 to issuer server 208 at step 310 may include any one or more of the data elements identified in table 400C of FIG. 4C—i.e. any one or more of (i) a currency associated with the payment transaction (e.g. Indian Rupees, US dollar etc.), (ii) a transaction amount, (iii) a merchant name, (iv) a token number, and (v) the generated OTP.

At step 312, issuer server 208 first identifies from within the issuer's records, a payor device associated with the payment card identifier (or payment account identifier) received from payment network validation server 210. In an embodiment, the identified payor device is the registered device/registered mobile device that is associated with the payment card/payment account within the records of the issuer institution.

At step 314, issuer server 208 transmits at least the OTP and optionally, the received payor digital wallet name onward to the payor device that has been identified at step 312. The data transmitted at step 314 may be transmitted over a first communication network of a first type—for example, over public switched terminal network 212, by way of short messaging service (SMS) or an IVR based voice call.

At step 316, payor device 202 (to which issuer server 208 has transmitted data at step 314) receives the OTP from issuer server 208, and responsive to a user input that is received at a user interface implemented by a digital wallet corresponding to the received payor digital wallet name, transmits the received OTP to payment network validation server 210 over a communication network of a second type. In an embodiment, the communication network of the second type is an internet protocol (IP) based data network 214.

Transmission of the OTP from payor device 202 to payment network validation server 210 at step 316 may be achieved as part of transmission of a second set of data from payor device 202 to payment network validation server 210. In an embodiment, the second set of data may comprise any one or more of the data elements identified in table 400D of FIG. 4D—i.e. any one or more of (i) the merchant category code (MCC) associated with the intended payee, (ii) the merchant identifier (merchant ID) associated with the intended payee, (iii) currency associated with the payment transaction (e.g. Indian Rupees, US dollar etc.), (iv) the transaction amount, (v) the merchant name/payee name, (vi) the token number, (vii) the device identifier (device ID) associated with payor device 202, (vii) the device internet protocol (IP) address associated with payor device 202, (viii) the payment application instance identifier associated with the digital wallet instance being executed within payor device 202, (ix) the wallet identifier (wallet ID) associated with the digital wallet instance, and (x) the OTP.

At step 318 payment network validation server 210 generates (i) a first validation decision based on a comparison of the transaction data and chip data received through acquirer server 206 at step 306 against the first set of data received from payor device 202 at step 308, and (ii) a second validation decision based on a comparison of an OTP generated by payment network validation server 210 at step 310 against an OTP received by payment network validation server 210 from the payor device at step 316.

In the event the data received through acquirer server 206 at step 306 matches the first set of data received from payor device 202 at step 308, the first validation decision is a positive validation decision or a 'match decision'. Alternatively, if the data received at step 306 does not match the first set of data received at step 308, the first validation decision is a negative validation decision or a 'no-match decision'.

In the event the OTP generated by payment network validation server 210 at step 310 matches the OTP received from payor device 202 at step 316, the second validation decision is a positive validation decision or a 'match decision'. Alternatively, if the OTP generated by payment network validation server 210 at step 310 does not match the OTP received from payor device 202 at step 316, the second validation decision is a negative validation decision or a 'no-match decision'.

At step 320, payment network validation server 210 transmits an authentication decision to issuer server 208—wherein the authentication decision is based on the first and second validation decisions. If both the first and second validation decisions are positive validation decisions (i.e. 'match decisions') the authentication decision transmitted by payment network validation server 210 is a positive authentication decision (i.e. an authentication decision confirming that the requested transaction and identity of the payor has been successfully authenticated). If either of the first and second validation decisions are negative validation decisions (i.e. 'no-match decisions') the authentication decision transmitted by payment network validation server 210 is a negative authentication decision (i.e. an authentication decision confirming that authentication of at least one of the requested transaction and identity of the payor has failed).

At step 322, issuer server 208 implements the requested payment transaction based on the authentication decision received from payment network validation server 210 at step 320. In an embodiment, (i) in response to the authentication decision received from payment network validation server 210 at step 320 comprising a positive authentication decision, issuer server 208 implements the requested payment transaction, (ii) whereas in response to the authentication decision received from payment network validation server 210 at step 320 comprising a negative authentication decision, issuer server 208 rejects or refuses the requested payment transaction.

Figure 5:
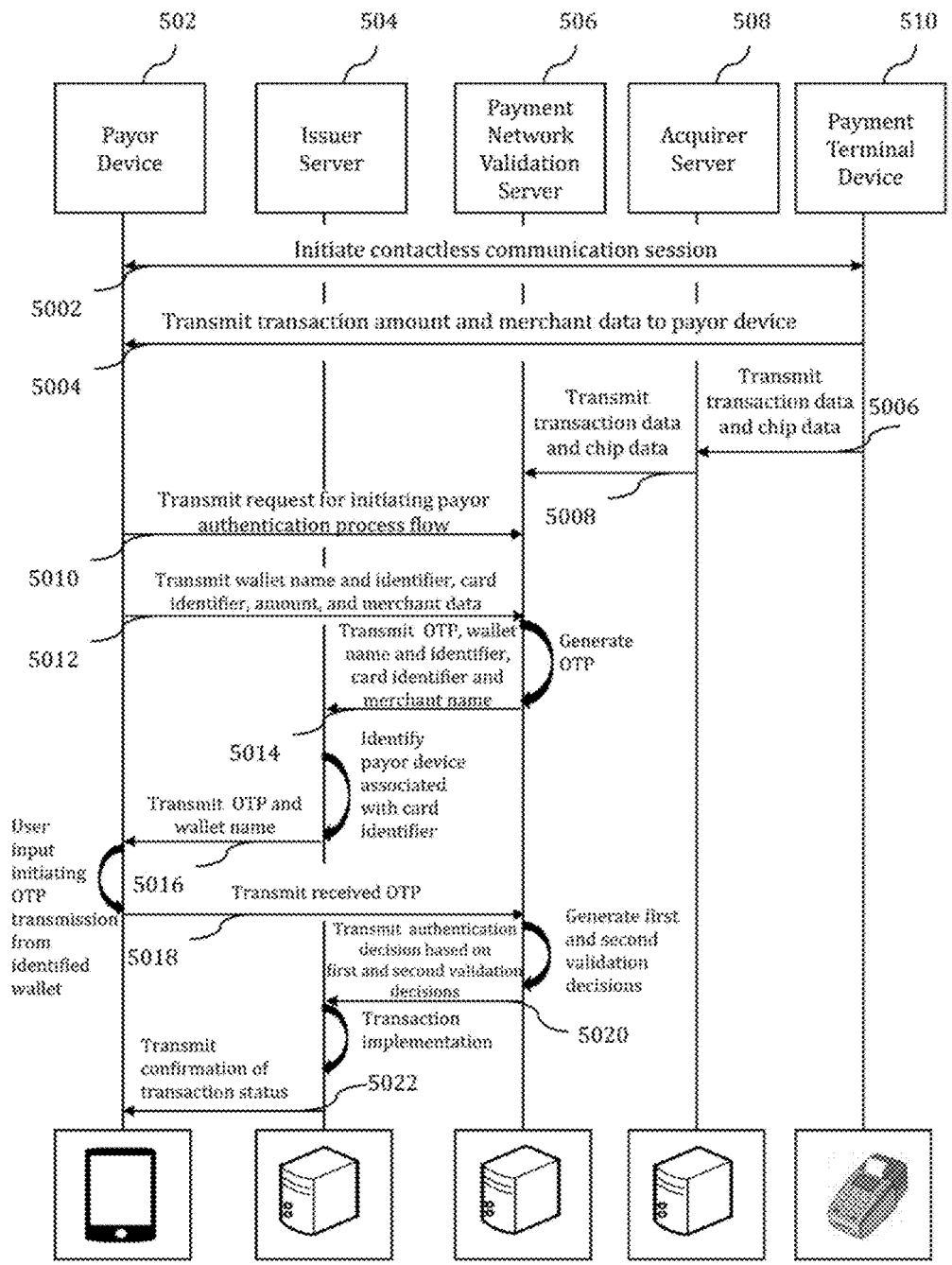
FIG. 5 is a communication flow diagram illustrating an exemplary communication flow between system entities for effecting a payor device based contactless payment transaction in accordance with the teachings of the present invention.

FIG. 5 is a communication flow diagram illustrating an exemplary communication flow between system entities for effecting a mobile device based contactless payment transaction in accordance with the teachings of the present invention.

As shown, at step 5002 a contactless communication session is initiated between payor device 502 and payment terminal device 510. The contactless communication session may be initiated by placing payor device 502 in proximity of payment terminal device 510 and optionally providing a user input on either of the two devices for initiating a contactless communication session therebetween. In a specific embodiment, the user input for initiating the contactless communication session may be provided to a digital wallet application software that is implemented within payor device 502. In an embodiment, the contactless communication session may comprise a NFC protocol based communication session.

Step 5004 comprises transmitting at least a transaction amount and merchant data from payment terminal device 510 to payor device 502. The transaction amount and merchant data are transmitted over the contactless communication session that has been initiated between the two entities at step at least a transaction amount and merchant data from payment terminal device 510 to payor device 502. The transaction amount and merchant data are transmitted over the contactless communication session that has been initiated between the two entities.

In an embodiment, the merchant data transmitted from payment terminal device 510 to payor device 502 may comprise any one or more of the data elements identified in table 400A of FIG. 4A—i.e. any one or more of (i) a merchant identifier (merchant ID) associated with an intended payee, (ii) a merchant category code (MCC) associated with an intended payee, (iii) a currency associated with the payment transaction (e.g. Indian Rupees, US dollar etc.), and (iv) a merchant name/payee name.

At step 5006, payment terminal device 510 transmits to acquirer server 508, (i) transaction data corresponding to the payment transaction and (ii) chip data corresponding to a payment card associated with the payment transaction (i.e. chip data corresponding to an integrated circuit (IC) chip that is implemented within a payment card that is being used by the digital wallet within payor device 502 for the purposes of executing the payment transaction. The transaction data transmitted at step 5006 may include any one or more of (i) a merchant identifier (merchant ID) associated with an intended payee, (ii) a merchant category code (MCC) associated with an intended payee, (iii) a currency associated with the payment transaction (e.g. Indian Rupees, US dollar etc.), and (iv) a merchant name/payee name. In an embodiment, the chip data transmitted at step 306 may include an Europay-Mastercard-Visa (EMV) chip identifier associated with the relevant payment card.

In an embodiment, the data transmitted from payment terminal device 510 at step 5006 may comprise any one or more of the data elements identified in table 400E of FIG. 4E—i.e. any one or more of (i) the merchant category code (MCC) associated with the intended payee, (ii) a cryptogram associated with the payment card/payment account, (iii) the merchant identifier (merchant ID) associated with the intended payee, (iv) currency associated with the payment transaction (e.g. Indian Rupees, US dollar etc.), (v) the transaction amount, (vi) the merchant name/payee name, (vii) the token number, and (vii) token expiry information.

At step 5008, acquirer server 508 transmits onward to payment network validation server 506, the data received from payment terminal device 510 at step 5006—i.e. (i) the transaction data corresponding to the payment transaction and (ii) the chip data corresponding to a payment card associated with the payment transaction.

Meanwhile at step 5010, payor device 502 transmits to payment network validation server 506, a request for initiating a payor authentication process flow.

Thereafter at step 5012, payor device 502 transmits to payment network validation server 506, a first set of data associated with the payment transaction. The first set of data may include one or more of (i) a payor digital wallet identifier, (ii) a payor digital wallet name, (iii) a payment card identifier associated with the payment card, (iv) the transaction amount and (v) the merchant data received from the payment terminal device.

In a more specific embodiment, the first set of data may include any one or more of the data elements identified in table 400B of FIG. 4B—i.e. any one or more of (i) a merchant category code (MCC) associated with an intended payee, (ii) a merchant identifier (merchant ID) associated with the intended payee, (iii) a currency associated with the payment transaction (e.g. Indian Rupees, US dollar etc.), (iv) a merchant name/payee name, (v) a token number, (vi) a device identifier (device ID) associated with payor device 502, (vii) a device internet protocol (IP) address associated with payor device 502, (viii) payment application instance identifier associated with the digital wallet instance being executed within payor device 202, and (ix) a wallet identifier (wallet ID) associated with the digital wallet instance.

Payment network validation server 506 responds to the received request for initiating a payor authentication process flow by generating a one-time-password (OTP).

At step 5014, payment network validation server 506 transmits to issuer server 504 (a) the generated OTP, (b) the payment card identifier/payment account identifier, (c) the payor digital wallet identifier, (d) the payor digital wallet name, and (e) the merchant name.

In a specific embodiment, the data transmitted from payment network validation server 506 to issuer server 504 at step 5014 may include any one or more of the data elements identified in table 400C of FIG. 4C—i.e. any one or more of (i) a currency associated with the payment transaction (e.g. Indian Rupees, US dollar etc.), (ii) a transaction amount, (iii) a merchant name, (iv) a token number, and (v) the generated OTP.

Thereafter, issuer server 504 identifies from within the issuer's records, a payor device associated with the payment card identifier (or payment account identifier) received from payment network validation server 506. In an embodiment, the identified payor device is the registered device/registered mobile device that is associated with the payment card/payment account within the records of the issuer institution.

At step 5016, issuer server 504 transmits at least the OTP and optionally, the received payor digital wallet name onward to the payor device 502 that has been identified by issuer server 504. The data transmitted at step 5016 may be transmitted over a first communication network of a first type—for example, over a public switched terminal network, by way of short messaging service (SMS) or an IVR based voice call.

The payor thereafter provides a user input through a user interface implemented by a digital wallet corresponding to the received payor digital wallet name at payor device 502—wherein the user input initiates transmission of the OTP (that has been received at step 5016) to payment network validation server 506.

Step 5018 comprises responding to the user input by transmitting the received OTP from payor device 502 to payment network validation server 506. The transmission of the OTP at step 5018 may be implemented over a communication network of a second type. In an embodiment, the communication network of the second type is an internet protocol (IP) based data network.

In an embodiment, transmission of the OTP from payor device 502 to payment network validation server 506 at step 5018 may be achieved as part of transmission of a second set of data from payor device 502 to payment network validation server 506. In an embodiment, the second set of data may comprise any one or more of the data elements identified in table 400D of FIG. 4D—i.e. any one or more of (i) the merchant category code (MCC) associated with the intended payee, (ii) the merchant identifier (merchant ID) associated with the intended payee, (iii) currency associated with the payment transaction (e.g. Indian Rupees, US dollar etc.), (iv) the transaction amount, (v) the merchant name/payee name, (vi) the token number, (vii) the device identifier (device ID) associated with payor device 502, (vii) the device internet protocol (IP) address associated with payor device 502, (viii) the payment application instance identifier associated with the digital wallet instance being executed within payor device 502, (ix) the wallet identifier (wallet ID) associated with the digital wallet instance, and (x) the OTP.

Payment network validation server 506 generates (i) a first validation decision based on a comparison of the transaction data and chip data received through acquirer server 508 at step 5008 against the first set of data received from payor device 502 at step 5012, and (ii) a second validation decision based on a comparison on of the OTP that has been generated by payment network validation server 506 against an OTP received by payment network validation server 506 from the payor device 502 at step 5018.

In the event the data received through acquirer server 508 at step 5008 matches the first set of data received from payor device 502 at step 5012 the first validation decision is a positive validation decision or a 'match decision'. Alternatively, if the data received at step 5008 does not match the first set of data received at step 5012, the first validation decision is a negative validation decision or a 'no-match decision'.

In the event the OTP generated by payment network validation server 506 matches the OTP received from payor device 502 at step 5018, the second validation decision is a positive validation decision or a 'match decision'. Alternatively, if the OTP generated by payment network validation server 506 does not match the OTP received from payor device 502 at step 5018, the second validation decision is a negative validation decision or a 'no-match decision'.

At step 5020, payment network validation server 506 transmits an authentication decision to issuer server 504—wherein the authentication decision is based on the first and second validation decisions. If both the first and second validation decisions are positive validation decisions (i.e. 'match decisions') the authentication decision transmitted by payment network validation server 506 is a positive authentication decision (i.e. an authentication decision confirming that the requested transaction and identity of the payor has been successfully authenticated). If either of the first and second validation decisions are negative validation decisions (i.e. 'no-match decisions') the authentication decision transmitted by payment network validation server 506 is a negative authentication decision (i.e. an authentication decision confirming that authentication of at least one of the requested transaction and identity of the payor has failed).

Issuer server 504 thereafter implements the requested payment transaction based on the authentication decision received from payment network validation server 506 at step 5020. In an embodiment, (i) in response to the authentication decision received from payment network validation server 506 at step 5020 comprising a positive authentication decision, issuer server 504 implements the requested payment transaction, (ii) whereas in response to the authentication decision received from payment network validation server 506 at step 5020 comprising a negative authentication decision, issuer server 504 rejects or refuses the requested payment transaction.

At step 5022, issuer server 504 transmits a data message to payor device 502 confirming the transaction status. In an embodiment where the payment transaction has been successfully completed, the data message transmitted at step 5022 comprises a transaction completion confirmation message. In an embodiment where the payment transaction has not been completed, the data message transmitted at step 5022 comprises a transaction completion failure message.

Figure 6:
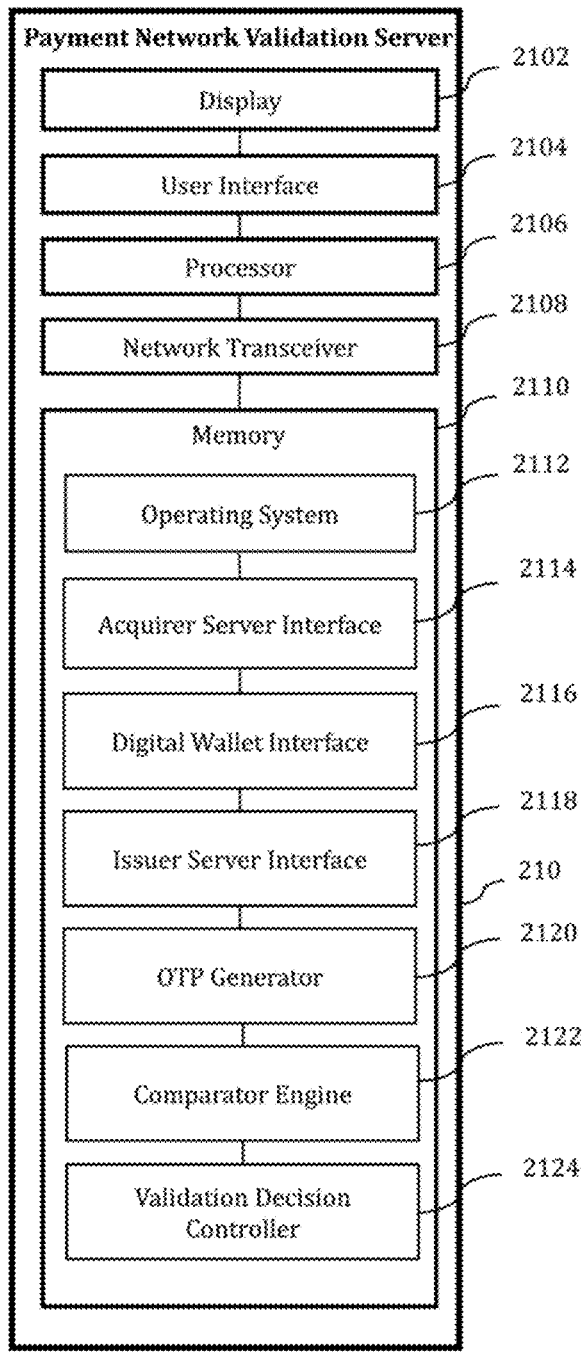
FIG. 6 illustrates an embodiment of a payment network validation server configured to implement a payor device based contactless payment transaction in accordance with the teachings of the present invention.

FIG. 6 illustrates an embodiment of a payment network validation server 210 (of the kind more generally discussed in connection with FIGS. 2 and 3 above) configured to implement a mobile device based contactless payment transaction in accordance with the teachings of the present invention.

As illustrated in FIG. 6, payment network validation server 210 comprises display 2102, a user interface 2104, processor 2106, network transceiver 2108 configured for enabling data network based communication, and memory 2100—which memory 2110 may include transitory memory and/or non-transitory memory. In an exemplary embodiment, memory 2110 may have stored therewithin, (i) an operating system 2112 configured for managing device hardware and software resources and that provides common services for software programs implemented within payment network validation server 210, (ii) an acquirer server interface 2114 configured to enable payment network validation server 210 to interface with an acquirer server (e.g. acquirer server 206 of FIG. 2), (iii) a digital wallet interface 2116 configured to enable payment network validation server 210 to interface with one or more digital wallet software applications implemented on payor devices, (iv) an issuer server interface 2118 configured to enable payment network validation server 210 to interface with an issuer server (e.g. acquirer server 208 of FIG. 2), (v) an OTP generator 2120 configured to generate an OTP in accordance with method step 310 of the method of FIG. 3, (vi) a comparator engine 2122 configured for implementing the comparisons of step 318 of the method of FIG. 3 (i.e. (i) a comparison of transaction data and chip data received through the acquirer server at step 306 against data received from the payor device at step 308, and (ii) a comparison on of an OTP generated by the payment network validation server at step 310 against an OTP received by the payment network validation server from the payor device at step 316) and (vii) a validation decision controller 2124 configured to generate the first and second validation decisions of step 318 of the method of FIG. 3.

In a particular embodiment, the invention provides a method for authentication of a contactless communication protocol based digital wallet payment transaction. The method comprises implementing within a payment network validation server, the steps of: (i) receiving from a payment terminal device (a) transaction data corresponding to a payment transaction that has been initiated through contactless communication between a payor device and the payment terminal device, and (b) chip data corresponding to an integrated circuit chip that is implemented within a payment card associated with the payment transaction, (ii) receiving from the payor device (c) a request for initiating payor authentication, and (d) a first set of data associated with the payment transaction, (iii) responding to the request for initiating payor authentication by (e) generating a first one-time-password (OTP), and (f) transmitting to an issuer server associated with the payment card the first OTP and the first set of data associated with the payment transaction, (iv) thereafter receiving from the payor device a second set of data associated with the payment transaction, the second set of data comprising a second OTP, and (v) transmitting an authentication decision to the issuer server, wherein the authentication decision is based on (g) a first validation decision based on a comparison between (1) data from the transaction data and chip data received by the payment network validation server from the payment terminal device and (2) data from the first set of data received by the payment network validation server from the payor device, and (h) a second validation decision based on a comparison between the first OTP generated by the payment network validation server and the second OTP received by the payment network validation server from the payor device.

In an embodiment of the method, the issuer server is configured to (i) implement the payment transaction in response to determining that the authentication decision is a positive authentication decision, and (ii) reject the payment transaction in response to determining that the authentication decision is a negative authentication decision.

In another method embodiment, (i) the transaction data received at the payment network validation server from the payment terminal device comprises any one or more of a merchant identifier associated with an intended payee, a merchant category code associated with a payee, a currency associated with the payment transaction, and a payee name, and (ii) the chip data comprises a chip identifier associated with the payment card.

In a specific embodiment of the method, (i) the first set of data received from the payor device includes any one or more of a payor digital wallet identifier, a payor digital wallet name, a payment card identifier associated with the payment card, a transaction amount and merchant data, and (ii) the transaction amount and the merchant data have been received at the payor device from the payment terminal device.

In a method embodiment, the merchant data received at the payor device from the payment terminal device comprises any one or more of a merchant identifier associated with an intended payee, a merchant category code associated with a payee, a currency associated with the payment transaction, and a payee name.

In a particular method embodiment, (i) the second OTP has been transmitted to the payor device from the issuer server over a first communication network of a first type, and (ii) the second set of data is received from the payor device over a second communication network of a second type, wherein the second type is different from the first type.

In an embodiment of the method, the first communication network comprises a public switched terminal network, and the second communication network comprises an internet protocol based data network.

In a specific method embodiment, (i) the authentication decision is a positive authentication decision in response to each of the first validation decision and the second validation decision comprising a positive match, or (ii) the authentication decision is a negative authentication decision in response to either of the first validation decision and the second validation decision comprising a match failure.

The invention additionally provides a system for authentication of a contactless communication protocol based digital wallet payment transaction. The system comprises a processor implemented payment network validation server, wherein the processor implemented payment network validation server is configured to (i) receive from a payment terminal device (a) transaction data corresponding to a payment transaction that has been initiated through contactless communication between a payor device and the payment terminal device, and (b) chip data corresponding to an integrated circuit chip that is implemented within a payment card associated with the payment transaction, (ii) receive from the payor device (c) a request for initiating payor authentication, and (d) a first set of data associated with the payment transaction, (iii) respond to the request for initiating payor authentication by (e) generating a first one-time-password (OTP), and (f) transmitting to an issuer server associated with the payment card the first OTP and the first set of data associated with the payment transaction, (iv) thereafter receive from the payor device a second set of data associated with the payment transaction, the second set of data comprising a second OTP, and (v) transmit an authentication decision to the issuer server, wherein the authentication decision is based on (g) a first validation decision based on a comparison between (1) data from the transaction data and chip data received by the payment network validation server from the payment terminal device and (2) data from the first set of data received by the payment network validation server from the payor device, and (h) a second validation decision based on a comparison between the first OTP generated by the payment network validation server and the second OTP received by the payment network validation server from the payor device.

The invention also provides a computer program product for authentication of a contactless communication protocol based digital wallet payment transaction. The computer program product comprise a non-transitory computer readable medium having a computer readable program code embodied therein. The computer readable program code comprises instructions for implementing within a payment network validation server, the steps of (i) receiving from a payment terminal device (a) transaction data corresponding to a payment transaction that has been initiated through contactless communication between a payor device and the payment terminal device, and (b) chip data corresponding to an integrated circuit chip that is implemented within a payment card associated with the payment transaction, (ii) receiving from the payor device (c) a request for initiating payor authentication, and (d) a first set of data associated with the payment transaction, (iii) responding to the request for initiating payor authentication by (e) generating a first one-time-password (OTP), and (f) transmitting to an issuer server associated with the payment card the first OTP and the first set of data associated with the payment transaction, (iv) thereafter receiving from the payor device a second set of data associated with the payment transaction, the second set of data comprising a second OTP, and (v) transmitting an authentication decision to the issuer server, wherein the authentication decision is based on (g) a first validation decision based on a comparison between (1) data from the transaction data and chip data received by the payment network validation server from the payment terminal device and (2) data from the first set of data received by the payment network validation server from the payor device, and (h) a second validation decision based on a comparison between the first OTP generated by the payment network validation server and the second OTP received by the payment network validation server from the payor device.

Figure 7:
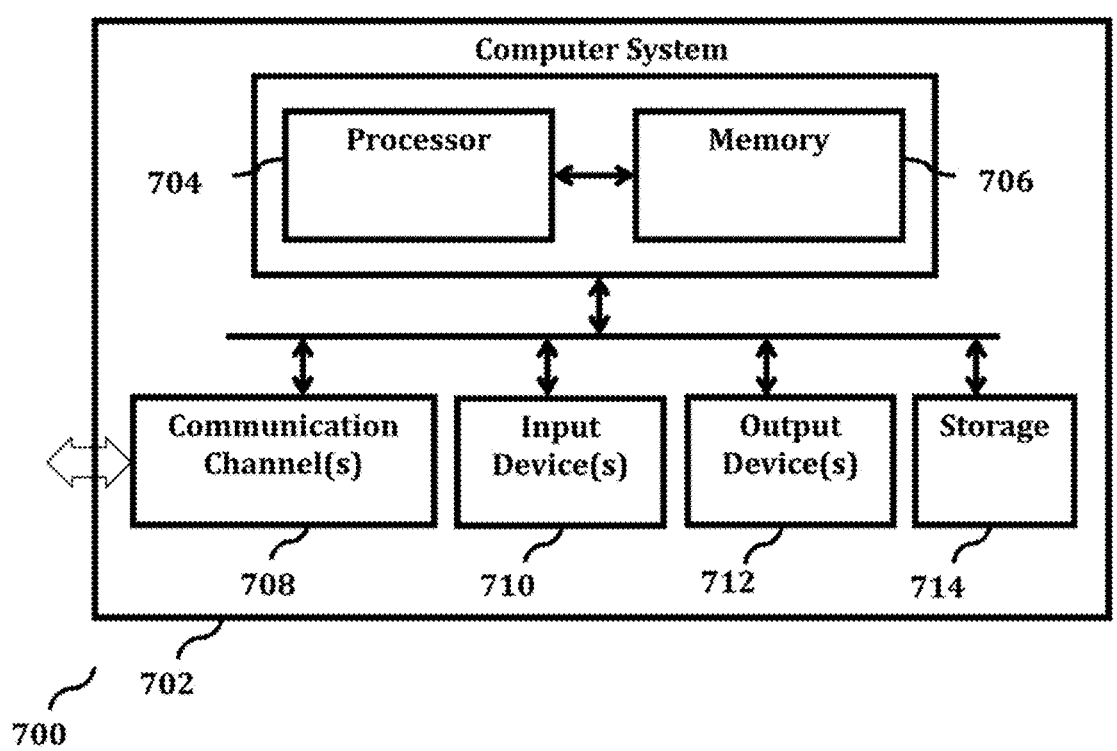
FIG. 7 illustrates an exemplary computer system according to which various embodiments of the present invention may be implemented.

FIG. 7 illustrates an exemplary computer system 700 according to which various embodiments of the present invention may be implemented.

System 700 includes computer system 702 which in turn comprises one or more processors 704 and at least one memory 706. Processor 704 is configured to execute program instructions—and may be a real processor or a virtual processor. It will be understood that computer system 702 does not suggest any limitation as to scope of use or functionality of described embodiments. The computer system 702 may include, but is not limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 702 in accordance with the present invention may include one or more servers, desktops, laptops, tablets, smart phones, mobile phones, mobile communication devices, phablets and personal digital assistants. In an embodiment of the present invention, the memory 706 may store software for implementing various embodiments of the present invention. The computer system 702 may have additional components. For example, the computer system 702 may include one or more communication channels 708, one or more input devices 710, one or more output devices 712, and storage 714. An interconnection mechanism (not shown) such as a bus, controller, or network, interconnects the components of the computer system 702. In various embodiments of the present invention, operating system software (not shown) provides an operating environment for various softwares executing in the computer system 702 using a processor 704, and manages different functionalities of the components of the computer system 702.

The communication channel(s) 708 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 710 may include, but is not limited to, a touch screen, a keyboard, mouse, pen, joystick, trackball, a voice device, a scanning device, or any another device that is capable of providing input to the computer system 702. In an embodiment of the present invention, the input device(s) 710 may be a sound card or similar device that accepts audio input in analog or digital form. The output device(s) 712 may include, but not be limited to, a user interface on CRT, LCD, LED display, or any other display associated with any of servers, desktops, laptops, tablets, smart phones, mobile phones, mobile communication devices, phablets and personal digital assistants, printer, speaker, CD/DVD writer, or any other device that provides output from the computer system 702.

The storage 714 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 702. In various embodiments of the present invention, the storage 714 may contain program instructions for implementing any of the described embodiments.

In an embodiment of the present invention, the computer system 702 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 702. The method described herein is typically implemented as a computer program product, comprising a set of program instructions that is executed by the computer system 702 or any other similar device. The set of program instructions may be a series of computer readable codes stored on a tangible medium, such as a computer readable storage medium (storage 714), for example, diskette, CD-ROM, ROM, flash drives or hard disk, or transmittable to the computer system 702, via a modem or other interface device, over either a tangible medium, including but not limited to optical or analogue communications channel(s) 708. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

While the exemplary embodiments of the present invention are described and illustrated herein, it will be appreciated that they are merely illustrative. It will be understood by those skilled in the art that various modifications in form and detail may be made therein without departing from or offending the scope of the invention as defined by the appended claims. Additionally, the invention illustratively disclose herein suitably may be practiced in the absence of any element which is not specifically disclosed herein—and in a particular embodiment that is specifically contemplated, the invention is intended to be practiced in the absence of any one or more element which are not specifically disclosed herein.

The invention claimed is:

1. A method, comprising:
receiving at a payment network validation server from a payment terminal device:
transaction data corresponding to a payment transaction that has been initiated through contactless communication between a payor device and the payment terminal device; and
chip data corresponding to an integrated circuit chip that is implemented within a payment card associated with the payment transaction;
receiving at the payment network validation server from the payor device:
a request for initiating payor authentication; and
a first set of data associated with the payment transaction;
responding, by the payment network validation server, to the request for initiating payor authentication by:
generating a first one-time-password (OTP); and
transmitting to an issuer server associated with the payment card:
the first OTP; and
the first set of data associated with the payment transaction;
thereafter receiving, at the payment network validation server from the payor device, a second set of data associated with the payment transaction, the second set of data comprising a second OTP; and
transmitting, by the payment network validation server, an authentication decision to the issuer server, wherein the authentication decision is based on:
a first validation decision based on a comparison between (i) data from the transaction data and chip data received by the payment network validation server from the payment terminal device; and (ii) data from the first set of data received by the payment network validation server from the payor device; and
a second validation decision based on a comparison between the first OTP generated by the payment network validation server and the second OTP received by the payment network validation server from the payor device, wherein
the payment network validation server is configured for independent network communication with the payor device via a data network and the payment terminal device via an acquirer server.

2. The method as claimed in claim 1, wherein the issuer server is configured for independent network communication with the payor device distinct from network communication with the payment network validation server; and
wherein the issuer server is configured to:
implement the payment transaction in response to determining that the authentication decision is a positive authentication decision; and
reject the payment transaction in response to determining that the authentication decision is a negative authentication decision.

3. The method as claimed in claim 1, wherein receiving at the payment network validation server from the payment terminal device comprises:
receiving at the acquirer server from the payment terminal device the transaction data and the chip data, wherein the acquirer server is configured for network communication with the payment network validation server; and
transmitting from the acquirer server to the payment network validation server the transaction data and the chip data, wherein:
the acquirer server is configured for independent network communication with the payment network validation server distinct from network communication with the payor device; and
wherein:
the transaction data received at the payment network validation server from the payment terminal device comprises any one or more of a merchant identifier associated with an intended payee, a merchant category code associated with a payee, a currency associated with the payment transaction, and a payee name; and
the chip data comprises a chip identifier associated with the payment card.

4. The method as claimed in claim 1, wherein:
the first set of data received from the payor device includes any one or more of a payor digital wallet identifier, a payor digital wallet name, a payment card identifier associated with the payment card, a transaction amount and merchant data; and
the transaction amount and the merchant data have been received at the payor device from the payment terminal device.

5. The method as claimed in claim 4, wherein the merchant data received at the payor device from the payment terminal device comprises any one or more of a merchant identifier associated with an intended payee, a merchant category code associated with a payee, a currency associated with the payment transaction, and a payee name.

6. The method as claimed in claim 1, wherein:
the second OTP has been transmitted to the payor device from the issuer server over a first communication network of a first type; and wherein the second set of data is received from the payor device over a second communication network of a second type, wherein the second type is different from the first type.

7. The method as claimed in claim 6, wherein:
the first communication network comprises a public switched terminal network; and
the second communication network comprises an internet protocol based data network.

8. The method as claimed in claim 1, wherein:
the authentication decision is a positive authentication decision in response to each of the first validation decision and the second validation decision comprising a positive match; or
the authentication decision is a negative authentication decision in response to either of the first validation decision and the second validation decision comprising a match failure.

9. A system for authentication of a contactless communication protocol based digital wallet payment transaction, comprising a processor implemented payment network validation server, wherein the processor implemented payment network validation server is configured to:
receive first network communication via an acquirer server from a payment terminal device comprising:
transaction data corresponding to a payment transaction that has been initiated through contactless communication between a payor device and the payment terminal device; and
chip data corresponding to an integrated circuit chip that is implemented within a payment card associated with the payment transaction;
receive second network communication via a data network from the payor device comprising:
a request for initiating payor authentication; and
a first set of data associated with the payment transaction, wherein the payment network validations server is configured to receive the first network communication and second network communications on distinct network paths;
respond to the request for initiating payor authentication by:
generating a first one-time-password (OTP); and
transmitting to an issuer server associated with the payment card:
the first OTP; and
the first set of data associated with the payment transaction;
thereafter receive from the payor device a second set of data associated with the payment transaction, the second set of data comprising a second OTP; and
transmit an authentication decision to the issuer server, wherein the authentication decision is based on:
a first validation decision based on a comparison between (i) data from the transaction data and chip data received by the payment network validation server from the payment terminal device and (ii) data from the first set of data received by the payment network validation server from the payor device; and
a second validation decision based on a comparison between the first OTP generated by the payment network validation server and the second OTP received by the payment network validation server from the payor device.

10. The system of claim 9, wherein the issuer server is configured to:
implement the payment transaction in response to determining that the authentication decision is a positive authentication decision; and
reject the payment transaction in response to determining that the authentication decision is a negative authentication decision.

11. The system of claim 9, wherein:
the transaction data received at the payment network validation server from the payment terminal device comprises any one or more of a merchant identifier associated with an intended payee, a merchant category code associated with a payee, a currency associated with the payment transaction, and a payee name;
the chip data comprises a chip identifier associated with the payment card.

12. The system of claim 9, wherein:
the first set of data received from the payor device includes any one or more of a payor digital wallet identifier, a payor digital wallet name, a payment card identifier associated with the payment card, a transaction amount and merchant data; and
the transaction amount and the merchant data have been received at the payor device from the payment terminal device.

13. The system of claim 9, wherein:
the second OTP has been transmitted to the payor device from the issuer server over a first communication network of a first type; and
wherein the second set of data is received from the payor device over a second communication network of a second type, wherein the second type is different from the first type.

14. The system of claim 9, wherein:
the authentication decision is a positive authentication decision in response to each of the first validation decision and the second validation decision comprising a positive match; or
the authentication decision is a negative authentication decision in response to either of the first validation decision and the second validation decision comprising a match failure.

15. A computer program product for authentication of a contactless communication protocol based digital wallet payment transaction, comprising a non-transitory computer readable medium having a computer readable program code embodied therein, the computer readable program code comprising instructions for implementing within a payment network validation server, the steps of:
receiving from a payment terminal device via an acquirer server:
transaction data corresponding to a payment transaction that has been initiated through contactless communication between a payor device and the payment terminal device; and
chip data corresponding to an integrated circuit chip that is implemented within a payment card associated with the payment transaction;
receiving from the payor device via a data network:
a request for initiating payor authentication; and
a first set of data associated with the payment transaction;
responding to the request for initiating payor authentication by:
generating a first one-time-password (OTP); and
transmitting to an issuer server associated with the payment card:
the first OTP; and the first set of data associated with the payment transaction;

thereafter receiving from the payor device a second set of data associated with the payment transaction, the second set of data comprising a second OTP; and transmitting an authentication decision to the issuer server, wherein the authentication decision is based on:
- a first validation decision based on a comparison between (i) data from the transaction data and chip data received by the payment network validation server from the payment terminal device and (ii) data from the first set of data received by the payment network validation server from the payor device; and
- a second validation decision based on a comparison between the first OTP generated by the payment network validation server and the second OTP received by the payment network validation server from the payor device, wherein the payment network validation server is configured to receive the chip data and the transaction data received from the payment terminal device and the request and the first set of data received from the payor device on independent network paths.

16. The computer program product of claim 15, wherein the issuer server is configured to:
implement the payment transaction in response to determining that the authentication decision is a positive authentication decision; and
reject the payment transaction in response to determining that the authentication decision is a negative authentication decision.

17. The computer program product of claim 15, wherein:
the transaction data received at the payment network validation server from the payment terminal device comprises any one or more of a merchant identifier associated with an intended payee, a merchant category code associated with a payee, a currency associated with the payment transaction, and a payee name;
the chip data comprises a chip identifier associated with the payment card.

18. The computer program product of claim 15, wherein:
the first set of data received from the payor device includes any one or more of a payor digital wallet identifier, a payor digital wallet name, a payment card identifier associated with the payment card, a transaction amount and merchant data; and
the transaction amount and the merchant data have been received at the payor device from the payment terminal device.

19. The computer program product of claim 15, wherein:
the second OTP has been transmitted to the payor device from the issuer server over a first communication network of a first type; and
wherein the second set of data is received from the payor device over a second communication network of a second type, wherein the second type is different from the first type.

20. The computer program product of claim 15, wherein:
the authentication decision is a positive authentication decision in response to each of the first validation decision and the second validation decision comprising a positive match; or
the authentication decision is a negative authentication decision in response to either of the first validation decision and the second validation decision comprising a match failure.

* * * * *